US011237387B2

(12) United States Patent
Magee et al.

(10) Patent No.: US 11,237,387 B2
(45) Date of Patent: Feb. 1, 2022

(54) ULTRASONIC LENS CLEANING SYSTEM WITH FOREIGN MATERIAL DETECTION

(71) Applicant: Texas Instruments Incorporated, Dallas, TX (US)

(72) Inventors: David Patrick Magee, Allen, TX (US); Stephen John Fedigan, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 67 days.

(21) Appl. No.: 15/583,057

(22) Filed: May 1, 2017

(65) Prior Publication Data

US 2018/0154406 A1 Jun. 7, 2018

Related U.S. Application Data

(60) Provisional application No. 62/429,991, filed on Dec. 5, 2016.

(51) Int. Cl.
*H01L 41/107* (2006.01)
*H01L 41/09* (2006.01)
*G02B 27/00* (2006.01)
*G02B 13/16* (2006.01)
*G02B 13/06* (2006.01)

(52) U.S. Cl.
CPC .......... *G02B 27/0006* (2013.01); *G02B 13/06* (2013.01); *G02B 13/16* (2013.01)

(58) Field of Classification Search
CPC ..... G02B 27/0006; G02B 13/06; G02B 13/16
USPC ................................................. 310/314–319
See application file for complete search history.

(56) References Cited

U.S. PATENT DOCUMENTS

| 3,681,626 A | 8/1972 | Puskas |
| 4,019,073 A | 4/1977 | Vishnevsky et al. |
| 4,271,371 A | 6/1981 | Furuichi et al. |
| 4,556,467 A | 12/1985 | Kuhn et al. |
| 4,607,652 A | 8/1986 | Yung |

(Continued)

FOREIGN PATENT DOCUMENTS

| CN | 1821539 A | 8/2006 |
| CN | 101274326 A | 10/2008 |

(Continued)

OTHER PUBLICATIONS

International Search Report for PCT/US2017/059536 dated Feb. 28, 2018.

(Continued)

*Primary Examiner* — Bryan P Gordon
(74) *Attorney, Agent, or Firm* — Michael A. Davis, Jr.; Charles A. Brill; Frank D. Cimino

(57) ABSTRACT

Disclosed examples include lens cleaning systems, drivers and operating methods, including a transducer mechanically coupled to a lens, a driver to provide an oscillating drive signal to the transducer and a controller to control the drive signal frequency to vibrate the lens at frequencies in a range of interest. The controller determines a measured resonant frequency of the lens cleaning system in the range of interest according to a transducer feedback signal and selectively performs a lens cleaning operation if the measured resonant frequency differs from a baseline resonant frequency of the lens cleaning system for a clean lens.

17 Claims, 11 Drawing Sheets

(56) References Cited

U.S. PATENT DOCUMENTS

| | | | |
|---|---|---|---|
| 4,654,554 A | 3/1987 | Kishi et al. | |
| 4,691,725 A | 9/1987 | Parisi | |
| 4,710,233 A | 12/1987 | Hohmann et al. | |
| 4,836,684 A | 6/1989 | Javorik et al. | |
| 4,852,592 A | 8/1989 | DeGangi et al. | |
| 4,870,982 A | 10/1989 | Liu | |
| 5,005,015 A | 4/1991 | Dehn et al. | |
| 5,071,776 A | 12/1991 | Matsushita et al. | |
| 5,113,116 A | 5/1992 | Wilson | |
| 5,155,625 A * | 10/1992 | Komatsu | B60R 1/0602 219/219 |
| 5,178,173 A | 1/1993 | Erickson et al. | |
| 5,313,333 A | 5/1994 | O'Brien et al. | |
| 5,853,500 A | 12/1998 | Joshi et al. | |
| 6,064,259 A | 5/2000 | Takita | |
| 6,607,606 B2 | 8/2003 | Bronson | |
| 7,215,372 B2 | 5/2007 | Ito et al. | |
| 7,705,517 B1 | 4/2010 | Koen et al. | |
| 8,286,801 B2 | 10/2012 | Youngs | |
| 8,293,026 B1 | 10/2012 | Bodor et al. | |
| 8,494,200 B2 | 7/2013 | Ram | |
| 8,899,761 B2 | 12/2014 | Tonar et al. | |
| 9,070,856 B1 | 6/2015 | Rose et al. | |
| 9,080,961 B2 | 7/2015 | Adachi | |
| 9,084,053 B2 | 7/2015 | Parkins | |
| 9,095,882 B2 | 8/2015 | Shimada et al. | |
| 9,226,076 B2 * | 12/2015 | Lippert | H04R 1/24 |
| 9,253,297 B2 | 2/2016 | Abe et al. | |
| 9,573,165 B2 | 2/2017 | Weber | |
| 2003/0214599 A1 | 11/2003 | Ito et al. | |
| 2006/0285108 A1 | 12/2006 | Morrisroe | |
| 2007/0046143 A1 | 3/2007 | Blandino | |
| 2007/0103554 A1 * | 5/2007 | Kaihara | G03B 19/12 348/207.99 |
| 2007/0159422 A1 | 7/2007 | Blandino | |
| 2008/0198458 A1 * | 8/2008 | Kashiyama | H04N 5/2254 359/508 |
| 2008/0248416 A1 | 10/2008 | Norikane | |
| 2010/0165170 A1 * | 7/2010 | Kawai | G02B 26/007 348/335 |
| 2010/0171872 A1 | 7/2010 | Okano | |
| 2011/0073142 A1 | 3/2011 | Hattori et al. | |
| 2011/0228389 A1 | 9/2011 | Ohashi | |
| 2013/0170685 A1 | 7/2013 | Oh | |
| 2013/0242481 A1 | 9/2013 | Kim | |
| 2013/0333978 A1 | 12/2013 | Abe | |
| 2014/0033454 A1 | 2/2014 | Koops et al. | |
| 2014/0218877 A1 | 8/2014 | Wei | |
| 2014/0253150 A1 | 9/2014 | Menzel | |
| 2015/0277100 A1 | 10/2015 | Novoselov | |
| 2016/0178898 A1 | 6/2016 | Eineren et al. | |
| 2016/0266379 A1 * | 9/2016 | Li | H04N 5/2171 |
| 2017/0361360 A1 * | 12/2017 | Li | B08B 7/028 |
| 2018/0085784 A1 | 3/2018 | Fedigan | |
| 2018/0085793 A1 | 3/2018 | Fedigan | |
| 2018/0117642 A1 * | 5/2018 | Magee | B06B 1/0284 |
| 2018/0239218 A1 | 8/2018 | Ikeuchi et al. | |
| 2018/0264526 A1 | 9/2018 | Kim | |
| 2018/0275397 A1 | 9/2018 | Chung et al. | |
| 2018/0304282 A1 | 10/2018 | Cook | |
| 2018/0304318 A1 | 10/2018 | Revier | |
| 2018/0326462 A1 | 11/2018 | Revier | |
| 2019/0277787 A1 | 9/2019 | Chung et al. | |

FOREIGN PATENT DOCUMENTS

| | | |
|---|---|---|
| CN | 101063830 A | 4/2009 |
| CN | 201223863 Y | 4/2009 |
| CN | 201579230 U | 9/2010 |
| CN | 103312948 A | 9/2013 |
| CN | 103376612 A | 10/2013 |
| DE | 102012214650 | 2/2014 |
| EP | 1703062 | 9/2006 |
| EP | 2479595 | 7/2012 |
| EP | 2777579 B1 | 4/2015 |
| EP | 2873572 A1 | 5/2015 |
| JP | 2009283069 A | 12/2009 |
| JP | 5608688 A | 10/2014 |
| KR | 20130076250 A | 7/2013 |
| WO | 2007005852 A2 | 1/2007 |
| WO | 2010104867 A1 | 9/2010 |
| WO | 2018207041 | 11/2018 |

OTHER PUBLICATIONS

Vaseiljev, "Ultrasonic system for solar panel cleaning", Sensors and Actuators A, vol. 200, Oct. 1, 2013, pp. 74-78.

Kazemi, "Substrate cleaning using ultrasonics/megasonics," 2011 IEEE/SEMI Advanced Semiconductor Manufacturing Conference, Saratoga Springs, NY, 2011, pp. 1-6.

Brereton, "Particle Removal by Focused Ultrasound", Journal of Sound and Vibration vol. 173, Issue 5, Jun. 23, 1994, pp. 683-698.

Gale, "Removal of Particulate Contaminants using Ultrasonics and Megasonics: A Review", Particulate Science and Technology, 1994, 13:3-4, 197-211.

Lee, "Smart self-cleaning cover glass for automotive miniature cameras," 2016 IEEE 29th International Conference on Micro Electro Mechanical Systems (MEMS), Shanghai, 2016, pp. 83-86.

Graff, "Wave Motion in Elastic Solids", Dover, 1991, 3 pgs.

Hagedom et al., "Travelling Wave Ultrasonic Motors, Part I: Working Principle and Mathematical Modelling of the Stator", Journal of Sound and Vibration, 1992, 155(1), pp. 31-46.

Howard, "High speed photography of ultrasonic atomization," Thesis, Brown University, May 13, 2010 (39 pages).

Ziaei-Moayyed et al., "Electrical Deflection of Polar Liquid Streams: A Misunderstood Demonstration," Journal of Chemical Education, vol. 77, No. 11, Nov. 2000 (4 pages).

U.S. Appl. No. 15/492,315, entitled "Methods and Apparatus for Ultrasonic Lens Cleaner Using Configurable Filter Banks," filed Apr. 20, 2017 (63 pages).

U.S. Appl. No. 15/492,286, entitled "Methods and Apparatus Using Multistage Ultrasonic Lens Cleaning for Improved Water Removal," filed Apr. 20, 2017 (62 pages).

U.S. Appl. No. 15/492,433, entitled "Methods and Apparatus for Surface Wetting Control," filed Apr. 20, 2017 (46 pages).

U.S. Appl. No. 15/492,395, entitled "Methods and Apparatus for Electrostatic Control of Expelled Material from Lens Cleaners," filed Apr. 20, 2017 (28 pages).

International Search Report for PCT/US2017/064530 dated Apr. 5, 2018.

International Search Report for PCT Application No. PCT/US2018/016714, dated Jun. 21, 2018 (2 pages).

Extended European Search Report on 17866470.2 dated Oct. 8, 2019.

Extended European Search Report for 17878085.4 dated Nov. 22, 2019.

Partial Supplementary European Search Report for 18747814.4 dated Jan. 30, 2020.

Office Action for Chinese Patent Application No. ;201780067964.X dated Apr. 23, 2021, 2 pages.

Office Action for Chinese Patent Application No. 201780069987.4 dated Apr. 23, 2021, 2 pages.

DE102012214650, English Machine Translation, 14 pages.

CN101274326A, English Machine Translation, 11 pages.

CN103376612A, English Machine Translation, 16 pages.

CN103312948AA, English Machine Translation, 15 pages.

CN201223863y, English Machine Translation, 16 pages.

CN101063830A, English Machine Translation, 29 pages.

CN201579230U, English Machine Translation, 11 pages.

TI-78189CN Chinese Office Action dated Sep. 27, 2021.

* cited by examiner

ULTRASONIC LENS CLEANING SYSTEM WITH FOREIGN MATERIAL DETECTION

Under 35 U.S.C. § 119, this application claims priority to, and the benefit of, U.S. Provisional Patent Application Ser. No. 62/429,991 that was filed on Dec. 5, 2016 and is entitled FOREIGN MATERIAL DETECTION USING NATURAL FREQUENCIES OF A LENS COVER SYSTEM, the entirety of which is incorporated by reference herein.

BACKGROUND

Camera systems are becoming more prevalent in automotive and other applications, such as vehicle cameras, security cameras, industrial automation systems, and in other applications and end-use systems. Operation of camera and lighting systems is facilitated by clean optical paths, which can be hindered by dirt, water or other debris, particularly in outdoor applications such as vehicle mounted camera systems, outdoor security camera systems, camera systems in industrial facilities, etc. In particular, camera or light source lenses may be subject to ambient weather conditions, dirt and debris, and other contaminants which can obstruct or interfere with optical transmission through the lens. Automatic lens cleaning systems (LCSs) have been developed for vehicle and security cameras to self-clean a lens or lens cover. Such systems may include air or water spray apparatus, or mechanical wipers to wash a lens surface. Other lens cleaning systems electronically vibrate the lens to expel contaminants, water or other unwanted material from the lens cover to improve image quality or light transmission efficiency. Ultrasonic mechanical excitation or vibration has proved to be a more cost effective approach than water sprayer, mechanical wiper or air jet solutions, particularly to clean automotive camera system lenses (e.g., rear view and surround view systems). In many applications, clean lenses are important for correct system operation. However, ultrasonic cleaning systems can become worn through continuous use. Moreover, actuating a transducer to vibrate the lens consumes power, and unnecessary cleaning results in excessive power consumption. In vehicle systems or other applications using battery power, it is desired to conserve power, while maintaining adequate cleanliness of lenses for camera systems and lighting applications.

SUMMARY

Disclosed examples include lens cleaning systems, drivers and operating methods, including a transducer mechanically coupled to a lens, a driver to provide an oscillating drive signal to the transducer, and a controller to control the drive signal frequency to vibrate the lens at frequencies in a range of interest. The controller determines a measured resonant frequency of the lens cleaning system in the frequency range of interest according to a transducer feedback signal, and selectively performs a lens cleaning operation if the measured resonant frequency differs from a baseline resonant frequency of the lens cleaning system for a clean lens. Typically, the frequency response of the lens cleaning system is used to evaluate the resonant frequencies of interest. The frequency response can be measured as an impedance response, admittance response or other frequency domain equivalent. In this disclosure, the impedance response will be used to convey the concepts related to this invention.

Disclosed examples provide lens cleaning solutions to detect the presence of contaminants on the lens to facilitate intelligent cleaning when appropriate and to selectively refrain from lens cleaning when little or no contaminants are present. In certain examples, cleaning levels, such as transducer power level and/or cleaning duration are determined according to the amount of change from the baseline resonant frequency. This technique facilitates high power cleaning to remove large amounts of contaminants, while conserving power by using light cleaning to remove small detected amounts of contaminants, or to delay cleaning when the lens is determined to be clean.

DETAILED DESCRIPTION

Figure 1:
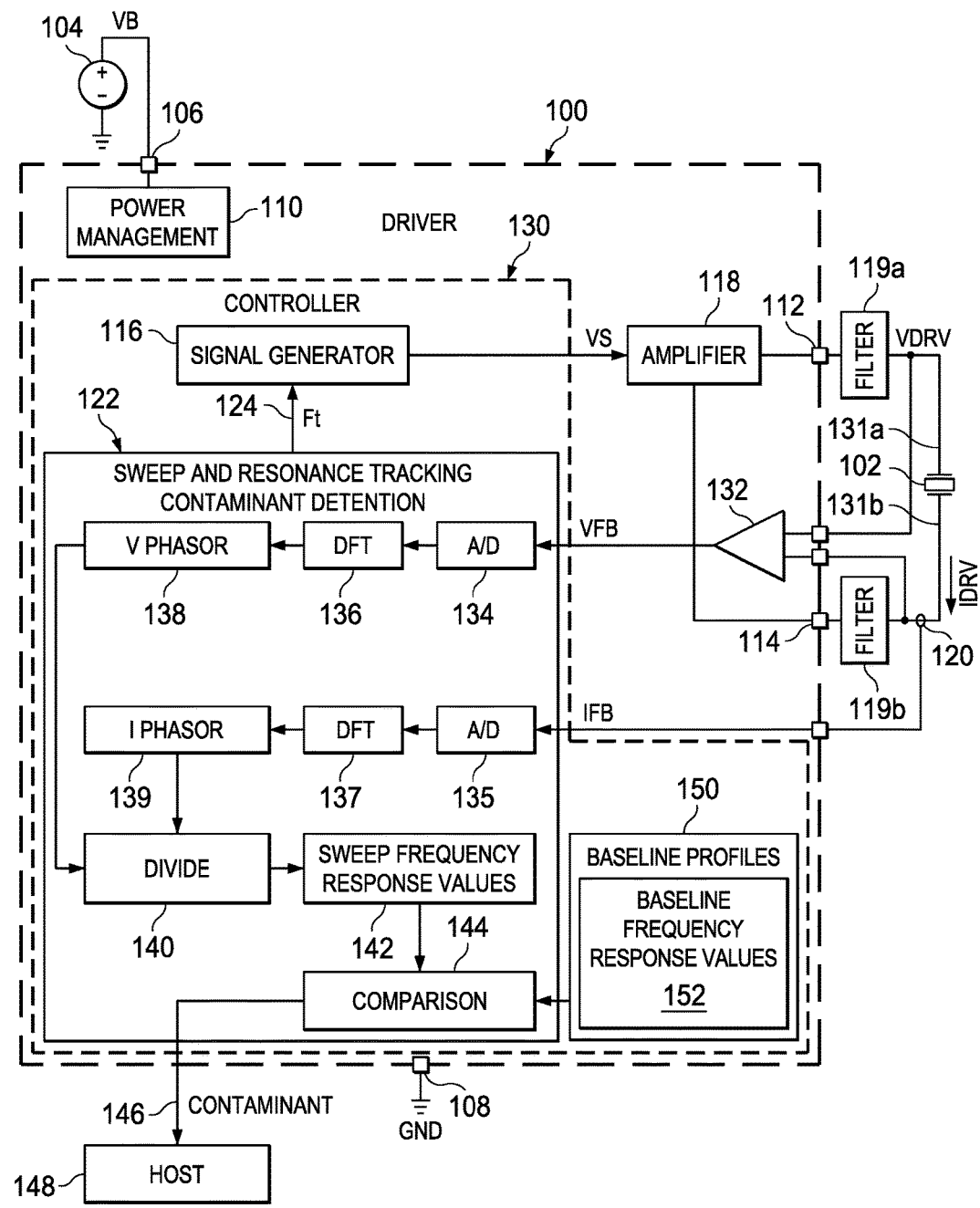
FIG. 1 is a schematic diagram of a lens cleaning system.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . ." Also, the term "couple" or "couples" is intended to include indirect or direct electrical or mechanical connection or combinations thereof. For example, if a first device couples to or is coupled with a second device, that connection may be through a direct electrical connection, or through an indirect electrical connection via one or more intervening devices and connections.

Figure 2:
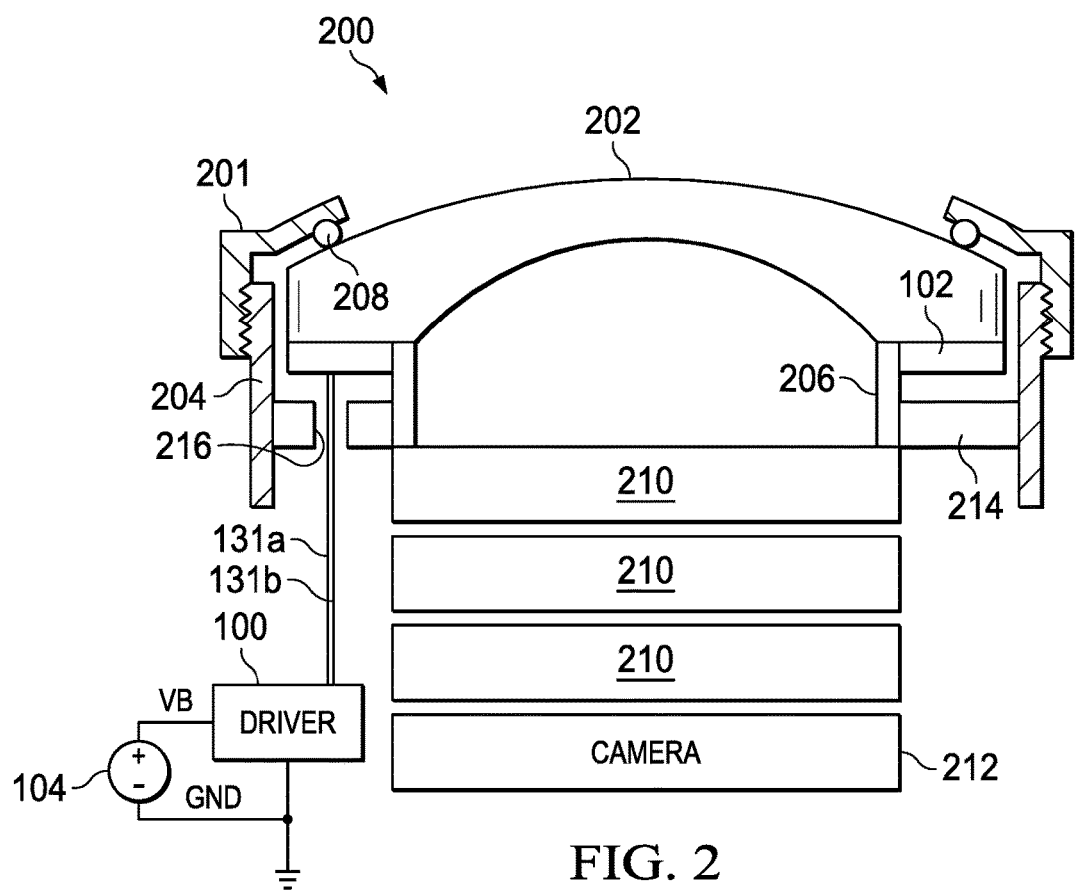
FIG. 2 is a partial sectional side elevation view of a camera lens assembly including a lens cleaning system.

Referring initially to FIGS. 1 and 2, FIG. 1 shows an ultrasonic lens cleaning system with a driver integrated circuit (IC) 100 and FIG. 2 shows a camera lens assembly 200 including an ultrasonic lens cleaning system. As seen in FIG. 2, the lens assembly 200 includes a cylindrical or "ring" transducer 102 which is mechanically coupled to vibrate a lens 202. In one example, the transducer 102 is bonded to the lens 202. Although illustrated in the context of a camera lens system, various concepts of the present disclosure can also be used in lighting systems or other optical systems, with or without a camera. Disclosed apparatus and techniques facilitate automatic detection of the presence or substantial absence of contaminants on the lens 202, and can be advantageously employed for selective lens cleaning when a threshold amount of contaminants are detected. In addition, certain examples provide for threshold based determination of one or more cleaning parameters, such as cleaning power and/or cleaning duration based on determination of an amount of contaminants present on the lens 202. The concepts of the present disclosure can be used for contaminant detection alone. In addition, the disclosed apparatus and methods can be employed, for example, in lens cleaning systems having a controller 130 and a transducer 102 which can also be used for automatic lens cleaning operations. As used herein, a lens can be a focusing element or other lens that implements optical shaping or other optical effect to aid camera imaging, as well as a lens cover or optical window that merely provides protection for further optical elements without performing any imaging functions.

The lens 202 in one example is a "fisheye" lens having a curved outer surface as shown in FIG. 2. In other examples, a flat lens or a lens having a different profile can be used. The lens assembly in this example is mounted to a generally cylindrical housing 204 using a cylindrical cap fastener 201 and is sealed using an O-ring 208 extending between an edge of the lens 202 and the fastener 201 to prevent ingress of water or debris into the interior of the housing 204. In one example, the housing 204 can be mounted to a motor vehicle to operate as a lens cover for a rear backup camera, a forward-facing camera or a side-facing camera. In other examples, the assembly 200 can be mounted to a building or a light pole, for example, for security camera or lighting applications. In other examples, the assembly 200 can be used for interior security monitoring systems, such as within a commercial or residential building. In this example, a series of generally flat secondary lenses 210 are disposed within the inner surfaces of the spacer 206. The secondary lenses 210 and the fisheye lens 202 provide an optical path for imaging by a camera 212. The transducer 102 includes lead wires or terminals 131a and 131b that extend through an opening 216 in a base 214 of the housing 204 for connection with the driver IC 100. In the example of FIG. 2, the lens 202 is mounted into the cylindrical housing 204 with a cylindrical inner spacer structure 206. The transducer 102 in this example is a cylindrical ring-shaped piezo-electric transducer disposed between the inner spacer 206 and the outer wall of the housing 204.

As best shown in FIG. 1, the driver IC 100 includes a power input pin or pad 106 that receives input power from a power supply or power source 104, such as a battery providing a battery voltage signal VB with respect to a reference node 108 having a reference voltage (e.g., GND). The driver IC 100 includes a power management circuit 110 that receives the battery voltage signal VB and provides one or more supply voltages (not shown) to power the internal circuitry of the driver 100. In addition, the IC 100 includes an output with terminals 112 and 114 for connection to the lead wires 131a and 131b, respectively, of the transducer 102. In operation, the driver 100 output provides an oscillating drive signal VDRV at a non-zero frequency Ft to the transducer 102 to vibrate the lens 202. As discussed further below, the controlled vibration of the lens 202 via excitation of the transducer 102 facilitates cleaning or removal of contaminants or debris from the outer surface of the lens 202. In addition, the transducer 102 is controlled by the driver 100 in different modes for assessing the cleanliness of the lens 202, and for selectively cleaning the lens 202 when appropriate according to a determined presence and amount of contaminants on the lens 202. In certain examples, moreover, the driver IC 100 determines one or more baseline profiles to identify resonant frequencies for the system having a clean lens 202 to facilitate subsequent determination of the presence or absence of contaminants on the lens 202.

As shown in FIG. 1, the driver IC 100 includes a controller or control circuit 130 with a signal generator 116. In one example, the controller 130 is a processor with an associated electronic memory. The controller 130 implements various cleaning, cleanliness detection, and optional calibration or baseline processing functions by controlling the oscillatory frequency Ft of the transducer 102. In one example, the controller 130 includes a sweep and resonance tracking, cleanliness detection circuit 122 with an output 124 that provides a desired frequency Ft to a signal generator circuit 116. In another possible implementation, the controller 130 is implemented in a processor, such as a DSP or other programmable digital circuit, which implements sweep and resonance tracking as well as cleanliness detection and calibration functions through execution of instructions stored in an associated memory to generate the frequency Ft as a digital value representing a desired frequency Ft of the drive signal VDRV. In one example, the signal generator 116 is a pulse width modulation (PWM) output of the processor that implements the controller 130. The signal generator circuit 116 provides an output signal VS that oscillates at a non-zero frequency Ft. In certain implementations, the controller 130 includes an integral electronic memory, or is operatively connected to an external electronic memory 150 that stores program instructions implemented by the processor, and stores baseline profiles that include baseline frequency response values 152, for example, baseline impedance values 152 that represent the frequency response of a lens cleaning system having a clean lens 202 as discussed further below.

The driver IC 100 further includes an amplifier 118 which amplifies the output signal VS to generate the oscillating drive signal VDRV. In this manner, the controller 130 provides the desired frequency Ft of the drive signal VDRV, and thereby control the oscillatory frequency of the transducer 102 for cleaning the lens 202 and/or to implement baseline calibration and cleanliness detection functions as described herein. In one example, the amplifier 118 is a full H-bridge amplifier circuit with first and second outputs individually coupled with the transducer terminals 131a and 131b to provide the oscillating drive signal VDRV to the transducer 102. In the example of FIG. 1, moreover, an L-C filter circuit 119 is connected between the amplifier outputs and the transducer terminals 131a and 131b. In one possible implementation, the filter 119 includes a first filter circuit 119a connected between a first output of the amplifier 118 and the first transducer terminal 131a, as well as a second filter circuit 119b connected between the second output of the amplifier 118 and the second transducer terminal 131b. A variety of different signal generator circuits 116 can be used, including a PWM processor output that generates a modulated square wave signal VS, or other signal generator circuitry to provide modulated sinusoidal, modulated triangular, modulated saw tooth or other waveforms having a non-zero signal frequency Ft. In one example, the first output of the amplifier 118 delivers an oscillating drive signal to the transducer 102 and the second amplifier output delivers an oscillating drive signal to the transducer 102 which is 180 degrees out of phase with respect to the first output.

In certain examples, the amplifier 118 can provide a single ended output through the first filter circuit 119a to the first output terminal 112, and the return current from the transducer 102 flows through the second filter circuit 119b to return to the second output of the amplifier 118. In the illustrated example, the amplifier 118 provides a differential output to the filters 119a, 119b. In this case, the individual filter circuits 119a and 119b each include a series inductor and a capacitor connected between the second inductor terminal and a common reference voltage (e.g., GND) to deliver the amplified signal to the transducer 102. In this manner, the amplifier 118 amplifies the signal generator output signal VS and delivers an oscillating drive signal VDRV to the transducer 102. The filter circuit 119 advantageously allows the use of a modulated square wave output from the PWM signal generator 116 to provide a generally sinusoidal oscillating signal VDRV to vibrate the transducer 102 and the mechanically coupled lens 202.

The driver IC 100 also includes a feedback circuit that generates one or more feedback signals that represent an electrical property of the transducer 102. In one example, the feedback circuit includes a current sensor or current transducer 120 a current feedback signal IFB representing a current IDRV flowing through the transducer 102. The feedback circuitry also includes a differential amplifier 132 with inputs connected across the transducer output terminals 112 and 114, as well as an amplifier output that generates a voltage feedback signal VFB representing the transducer voltage. The feedback signals IFB and VFB are provided to the controller 130. In one example, the controller 130 includes analog-to-digital (A/D) converters 135 and 134 to respectively convert the current and voltage feedback signals IFB and VFB to digital values. In one possible implementation, the controller 130, the amplifier 118, the output filter circuitry 119 and the feedback circuitry are fabricated in a single integrated circuit 100. The driver 100 can be provided on a single printed circuit board (PCB) along with a camera 212 (or a light source) to provide a compact solution for various vehicle-based and/or security camera systems or lighting systems generally.

The driver IC 100 operates in a normal mode to selectively provide ultrasonic lens cleaning functions in conjunction with the associated transducer 102. The outer surface of the lens 202 in FIG. 2 may be exposed to dirt, debris, water and other optical obstructions, referred to herein as contaminants, particularly in outdoor installations. The driver 100 provides an oscillating signal to cause the transducer 102 to vibrate the lens 202 to facilitate or promote cleaning of the lens 202. In one example, the driver 100 provides an ultrasonic drive signal or voltage waveform VDRV to actuate the transducer 102 and cause the transducer 102 to mechanically vibrate the lens 202 using ultrasonic waves to remove dirt and/or water from the surface of the lens 202. Mechanical oscillation or motion of the lens 202 at ultrasonic waves of a frequency at or close to a system resonant frequency can facilitate energy efficient removal of water, dirt and/or debris from the lens 202. The driver IC 100 in one example provides a closed loop system using the feedback signals IFB and/or VFB during lens cleaning operation. In one example, the driver IC 100 regulates operation at or near a local minima or maxima in a current or impedance signal value ascertained from one or more feedback signals. In another possible implementation, the controller 130 controls the frequency Ft according to a measured resonant frequency FZM determined during cleanliness detection operation, in order to facilitate removal of a specific detected amount of contaminants on the lens 202. The controller 130 in one example uses the converted values from the A/D converters 134 and/or 135 to implement closed-loop control in driving the transducer 102 for lens cleaning operations.

The controller 130 also operates in a cleanliness detection mode to detect the presence or absence of contaminants on the lens 102. In a non-limiting implementation, the controller 130 determines the measured resonant frequency FZM during a cleanliness detection operation, and if cleaning is determined to be appropriate, begins the cleaning operation at a frequency Ft corresponding to the determined measured resonant frequency FZM, and gradually transitions the operating frequency Ft to a previously determined baseline resonant frequency FZB over the determined cleaning duration for a given cleaning operation. Moreover, as discussed below, the controller 130 in certain examples implements selective cleaning in a given cleaning cycle to first verify whether cleaning is appropriate, and if so the amount or level of cleaning to be done. If the lens 202 is determined to be substantially clean, the controller 130 refrains from performing a cleaning operation in that cleaning cycle. In this manner, the controller 130 advantageously conserves power and selectively avoids cleaning if unnecessary. In addition, the initial determination of a measured resonant frequency FZM during cleanliness detection mode operation allows the controller 130 to selectively employ multiple levels of cleaning based on the measured resonant frequency FZM. In addition, the controller 130 selectively determines corresponding cleaning parameters including without limitation cleaning duration and/or cleaning power based on the measured resonant frequency FZM. As shown in FIG. 1, moreover, the controller 130 in certain examples an output signal CONTAMINANT to a host system 148 via a driver IC output 146 to indicate detection of contaminants on the lens 202.

As shown in FIG. 1, the analog feedback signals VFB and IFB are converted to digital values by the A/D converters 134 and 135. The controller 130 in one example calculates discrete Fourier transform (DFT) components 136 and 137 to respectively provide voltage and current phasor values 138 and 139 based on time domain digital voltage and current feedback values from the converters 134 and 135. The controller 130 also implements a complex division (DIVIDE) function 140 to compute sweep frequency response values, such as sweep impedance values 142 as the ratio of the voltage phasor value 138 to the current phasor value 139 for a given sample. In this regard, the A/D converters operate at a sufficiently high sample frequency to obtain a stream of digital values representing the feedback voltage and current associated with the driven transducer 102. The processing implemented by execution of program instructions by the processor of the controller 130 provides a stream of frequency response values (e.g., impedance values 142). For a sweep of multiple frequencies in a predetermined frequency range of interest, a series of frequency response values 142 provide an frequency response profile as a function of frequency.

The inventors have appreciated that the presence or absence of contaminants on the lens 202 affects the mass of the lens cleaning system, and thus impacts the resonant frequency. Local minima and/or maxima of the measured frequency response (e.g., impedance) profile can be used to identify or determine a measured resonance or resonant frequency FZM associated with the mechanical impedance of the lens cleaning system including the additional mass of contaminants on the lens 202. Based on this principle, the controller 130 in one example compares a measured resonant frequency value FZM determined through impedance measurements at different frequencies, and compare the measured resonant frequency value with a baseline resonant frequency value FZB corresponding to a lens cleaning system having a substantially clean lens 202. The difference between these frequency values can be compared with one or more thresholds in order to automatically take one or more actions or refrain from one or more control actions. For example, if a first threshold amount of difference is not detected, the controller 130 can refrain from performing a lens cleaning operation until a subsequent cleaning cycle. In certain examples, if the initial threshold amount of frequency change is detected through this comparison, the controller 130 can further compare the frequency difference with a second higher threshold value, and set one or more cleaning parameters accordingly.

In the illustrated example, the controller 130 controls the frequency Ft of the drive signal VDRV to vibrate the lens 202 at a plurality of frequencies in a frequency range of interest. In one implementation, the controller 130 performs a frequency sweep for one or more predetermined frequency ranges of interest. The controller 130 digitally converts the feedback signals during the frequency sweep, obtains frequency spectrum phasor information 138 and 139, and divides these values 140 to obtain sweep frequency response values 142 corresponding to the frequencies in the range of interest. The controller 130 also determines a measured resonant frequency FZM from the sweep frequency response values 142 and implements a comparison function 144 that compares the measured resonant frequency FZM to a baseline resonant frequency value FZB associated with corresponding ones of the plurality of frequencies in a given frequency range of interest for a clean lens 202. The controller 130 uses the comparison to selectively determine the existence or presence of contaminants on the lens 202 according to an absolute value of the difference between the measured resonant frequency FZM and the baseline resonant frequency value FZB. This comparison can be performed in one example according to one or more threshold values. The controller 130 does not need to perform a continuous sweep, and instead may control the lens transducer drive signal frequency Ft to vibrate the lens 202 at one or more frequencies included in a predetermined frequency range of interest and computes the corresponding frequency response values 142 and one or more measured resonant frequency values FZM according to the driver feedback signals VFB, IFB.

Figure 3:
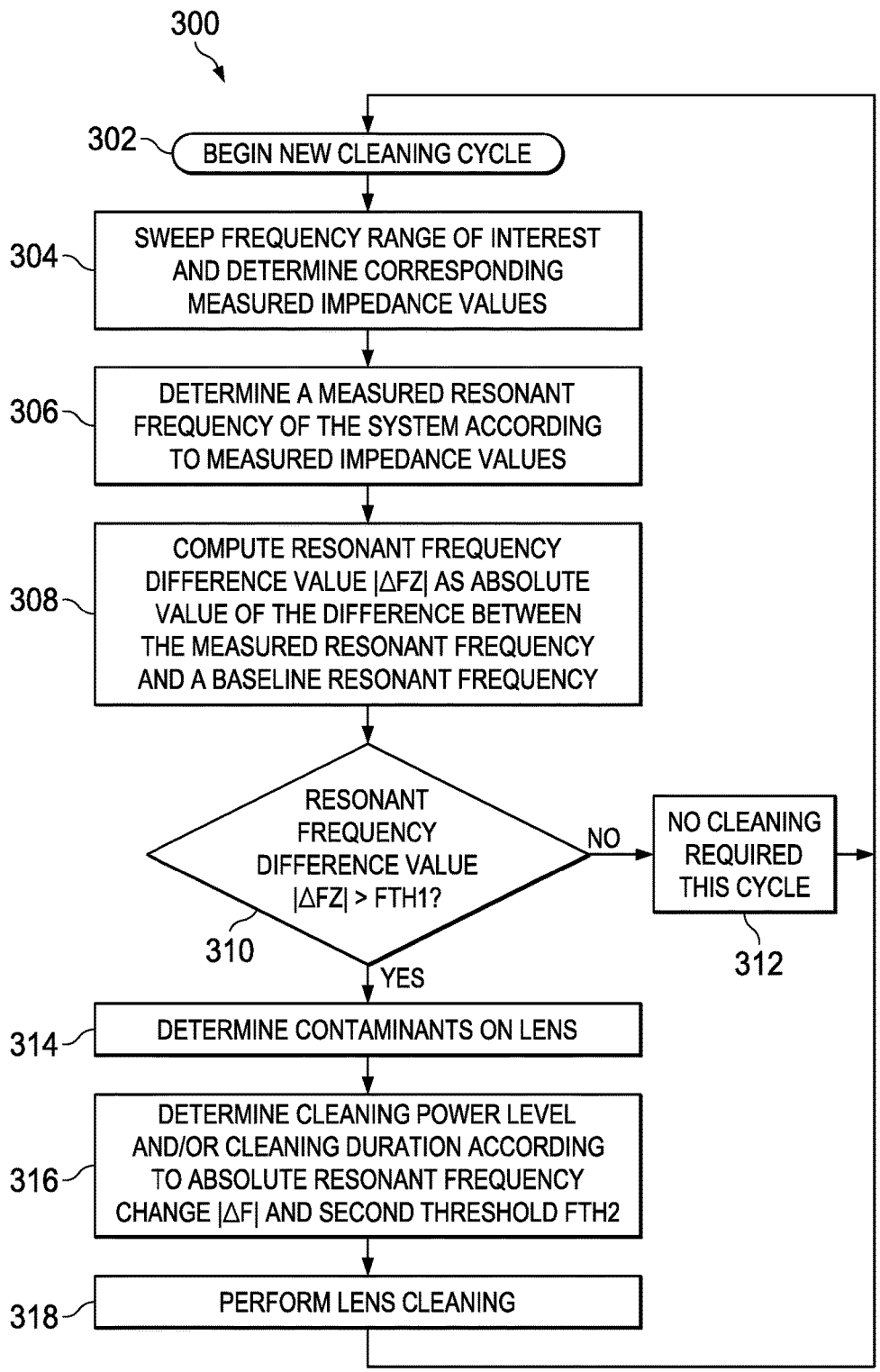
FIG. 3 is a flow diagram of an example lens cleaning process or method.
Figure 4:
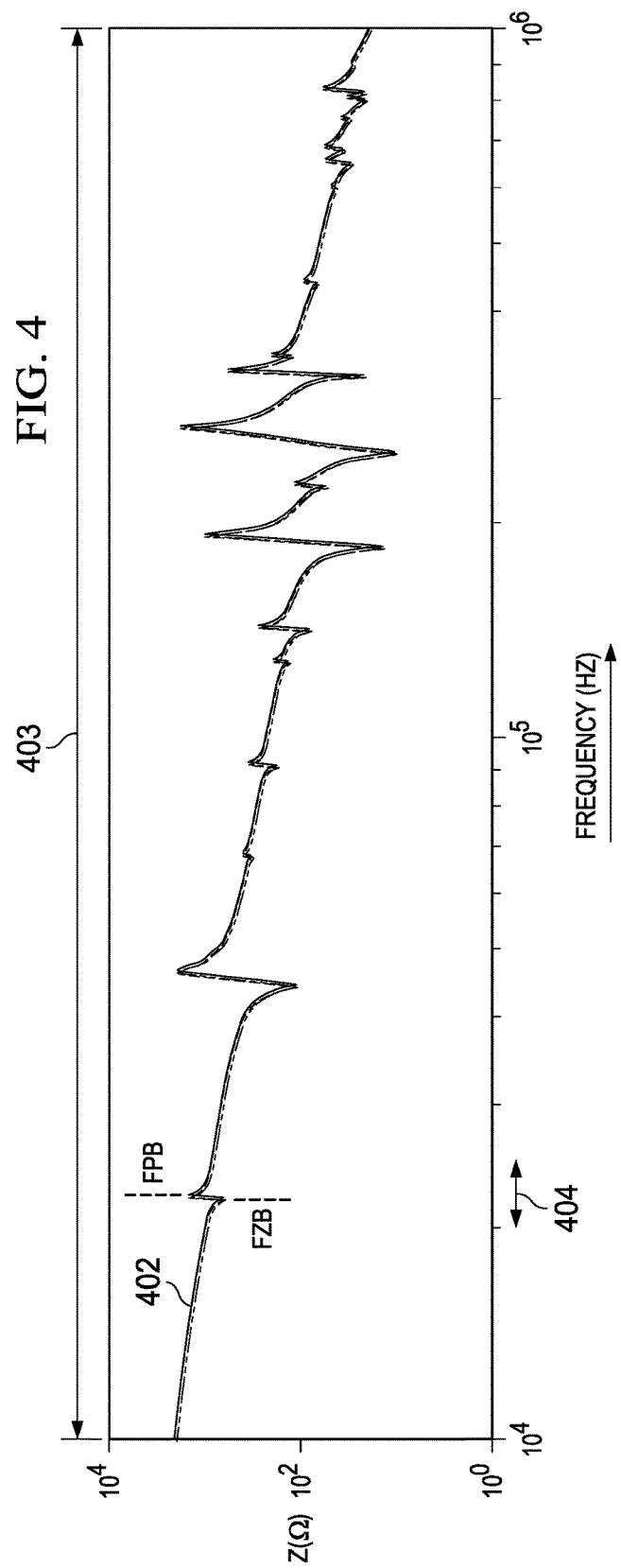
FIG. 4 is a graph of an example impedance magnitude response curve as a function of excitation frequency for a lens cleaning system with a clean lens.
Figure 5:
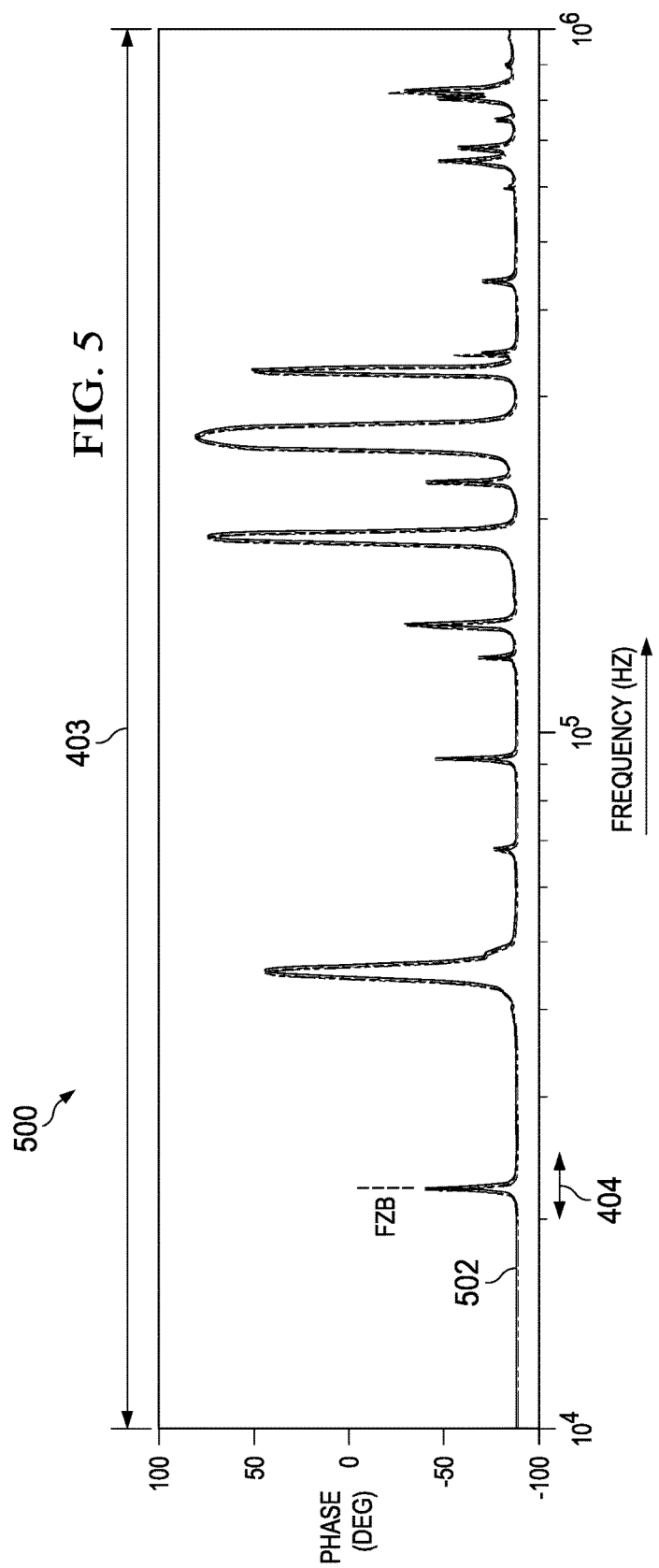
FIG. 5 is a graph of an example impedance phase angle response curve as a function of excitation frequency for a lens cleaning system with a clean lens.

Referring also to FIGS. 3-5, FIG. 3 shows an example process or method 300 to operate an ultrasonic lens cleaning system. The method 300 can be implemented in certain examples by a controller or processor, such as the lens cleaning system driver controller 130 described above. In various implementations, the method 300 can include cleanliness detection operation, as well as selective ultrasonic lens cleaning operation as illustrated in FIG. 3. In further possible implementations, the method 300 can also include an initial calibration or baseline processing sequence to establish one or more baseline profiles stored in the memory 150 including corresponding baseline frequency response values 152 and one or more baseline resonant frequency values corresponding to the associated lens cleaning system with a clean lens 202. In one example, the controller 130 of the lens cleaning system of FIGS. 1 and 2 is programmed or configured to implement the method 300 for detection of threshold amounts of contaminants on the lens 202 at 304-310, as well as selective ultrasonic cleaning at 314-318. The cleanliness detection operation utilizes baseline frequency response profile information stored in the memory 150 (FIG. 1), including baseline frequency response values (e.g., impedance values) 152 and one or more baseline resonant frequencies FZB derived from the baseline frequency response values 152.

FIG. 4 provides a graph 400 showing an example impedance magnitude response curve 402 as a function of transducer excitation frequency over a wide range 403, such as 10 to 1000 kHz in one non-limiting implementation. The impedance magnitude response curve 402 represents a baseline frequency response profile that can be stored in the memory 150, for example, as a plurality of frequency response values at different frequencies throughout the range 403. Other ranges may be used, preferably covering a usable range depending on the various masses of the structural components used in the optical system generally and the lens cleaning system in particular. FIG. 5 provides a corresponding graph 500 showing an example phase angle response curve 502 as a function of transducer excitation frequency over the same wide frequency range 403. In this example, the impedance curve 402 includes a number of local maxima corresponding to poles of the mechanical system, as well as a number of local minima corresponding to system zeros. A local maxima of the phase curve 502 is at the geometric mean between the pole and zero frequencies of the impedance curve 402. The graphs 400 and 500 depict an example frequency range of interest 404 having a corresponding pole FPB (local maxima) and a zero FZM (local minima).

The baseline processing or calibration can be implemented during a factory calibration operation, and/or in an installed host system when the lens 202 is known or believed to be clean. In one example, the controller 130 measures a baseline frequency response profile 150 that includes frequency response values 152 measured for the lens cleaning system with a clean lens 202 across a wide range 403 of frequencies that includes the frequency range of interest 404 in FIGS. 4 and 5. The controller 130 stores the baseline frequency response profile in a memory 150 of the lens cleaning system. The controller 130 in certain implementations also determines one or more frequency ranges of interest 404. In the example of FIGS. 4 and 5, the identified frequency range of interest 404 extends from approximately 20 kHz to 30 kHz for an example planar (i.e., flat) lens 202. The identified frequency range of interest 404 in this example includes the pole FPB at approximately 28.4 kHz and the zero FZB at approximately 28.2 kHz. The local zero FZB represents a natural resonant frequency of the lens cleaning system when the lens 202 is substantially clean (i.e., free of contaminants) for a planar or flat lens. In this example, the identified zero FZB corresponds to out of plane motion of the transducer 102.

In FIGS. 4 and 5, the baseline frequency response profile 402 also includes various other pole-zero pairs, including those illustrated at approximately 44 kHz. In this example, for a flat or planar lens 202, the pole-zero pair at 44 kHz represents in-plane motion, and is thus not used as a frequency range of interest as contaminants on the outer surface of the lens 202 are unlikely to have a significant effect on the resonant frequency of the system at this operating frequency of the transducer 102. In certain systems, not all of the natural frequencies change when contaminants are present on the lens 202, because the effective mass of the resonant mode does not change when material is added to the lens 202. For example, the natural frequency of 44 kHz in FIGS. 4 and 5 corresponds to a radial mode whose effective mass does not change because the shear force is not strong enough to move the contaminants when the lens 202 vibrates in the radial direction. The controller 130 can identify any number of eligible frequency ranges of interest for which a change in the resonant frequency of the system is indicative of the presence of contaminants on the lens 202. With one or more baseline resonant frequencies identified and corresponding frequency ranges of interest identified and stored, the controller 130 can operate to implement a cleaning regimen, such as a periodic cleaning cycle schedule during operation of the host system 148.

Figure 6:
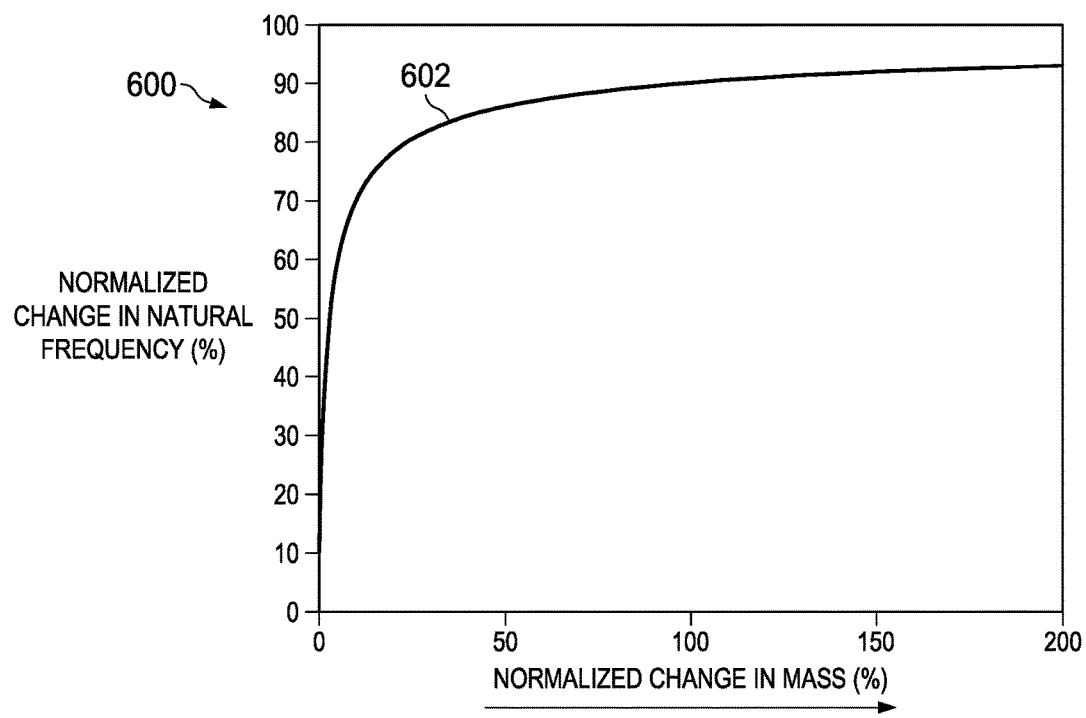
FIGS. 6 and 7 are graphs of normalized natural frequency change as a function of change in mass for a lens cleaning system.
Figure 7:
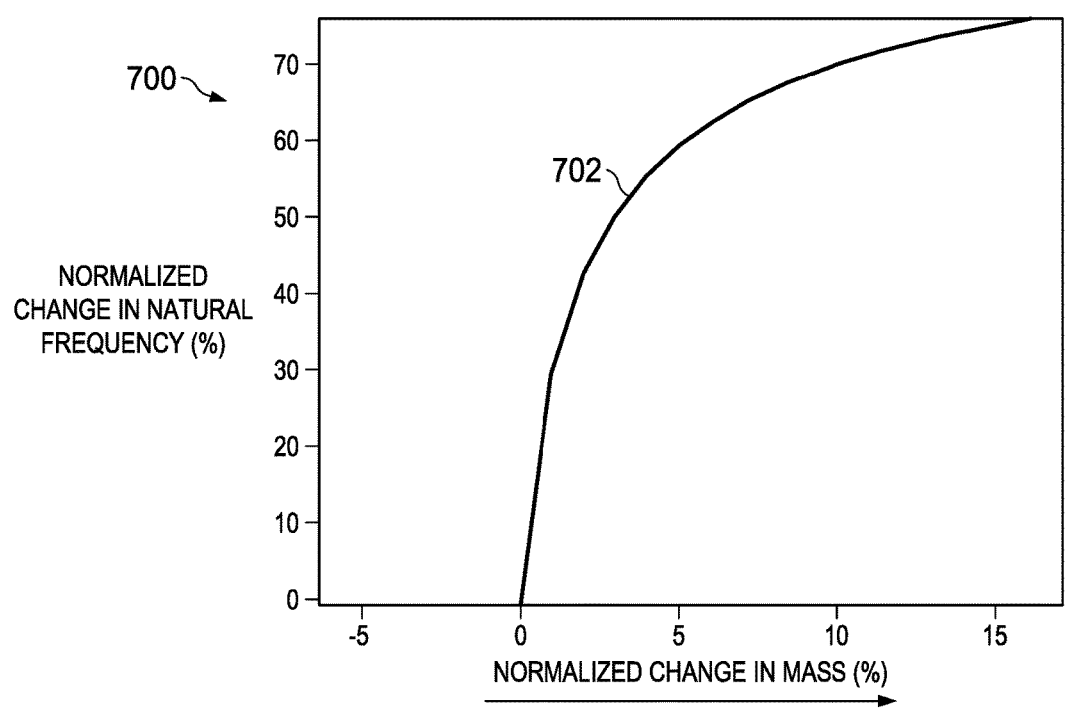

Referring also to FIGS. 6 and 7, resonance frequency of a mechanical system such as the lens cleaning apparatus of FIGS. 1 and 2 is often referred to as a natural frequency, $\omega_n$, because the mechanical system naturally vibrates when excited by a sinusoid at this particular frequency. The natural frequency can be represented mathematically according to the following equation (1):

$$\omega_n = \sqrt{\frac{k}{m}}, \qquad (1)$$

where k is the effective stiffness of the mechanical system (e.g., in N/m), and m is the effective mass of the mechanical system (e.g., in kg). The expected change in natural frequency due to additional material on the lens cover can be represented mathematically by the following equation (2):

$$\Delta \omega_{n_{norm}} = 1 - \sqrt{\frac{1}{1 + \Delta m_{norm}}}, \qquad (2)$$

where $$\Delta \omega_{n_{norm}} = \frac{\Delta \omega_n}{\omega_n} \qquad (3)$$

is the normalized change in natural frequency (unitless), and $$\Delta m_{norm} = \frac{\Delta m}{m} \qquad (4)$$

is the normalized change in mass (unitless).

FIG. 6 shows a graph 600 including a curve 602 illustrating the normalized change in natural frequency as a function of the normalized change in mass. As seen in the graph 600, the normalized change in natural frequency is very sensitive to a small normalized change in mass (e.g., less than 10%). For large normalized changes in mass (e.g., greater than 40%), the sensitivity is much less. However, the value of the normalized change is still quite large (e.g., approximately 90%) so a mass change is still easily detectible. A graph 700 in FIG. 7 includes a curve 702 over a smaller mass change range of −5% to +17%. The natural frequency sensitivity to a change in mass is particularly pronounced for a small change, where a 10% normalized change in mass results in a normalized change in natural frequency of approximately 70%. The inventors have appreciated that the natural frequency sensitivity can be used to detect when materials are present on the lens 202.

Figure 8:
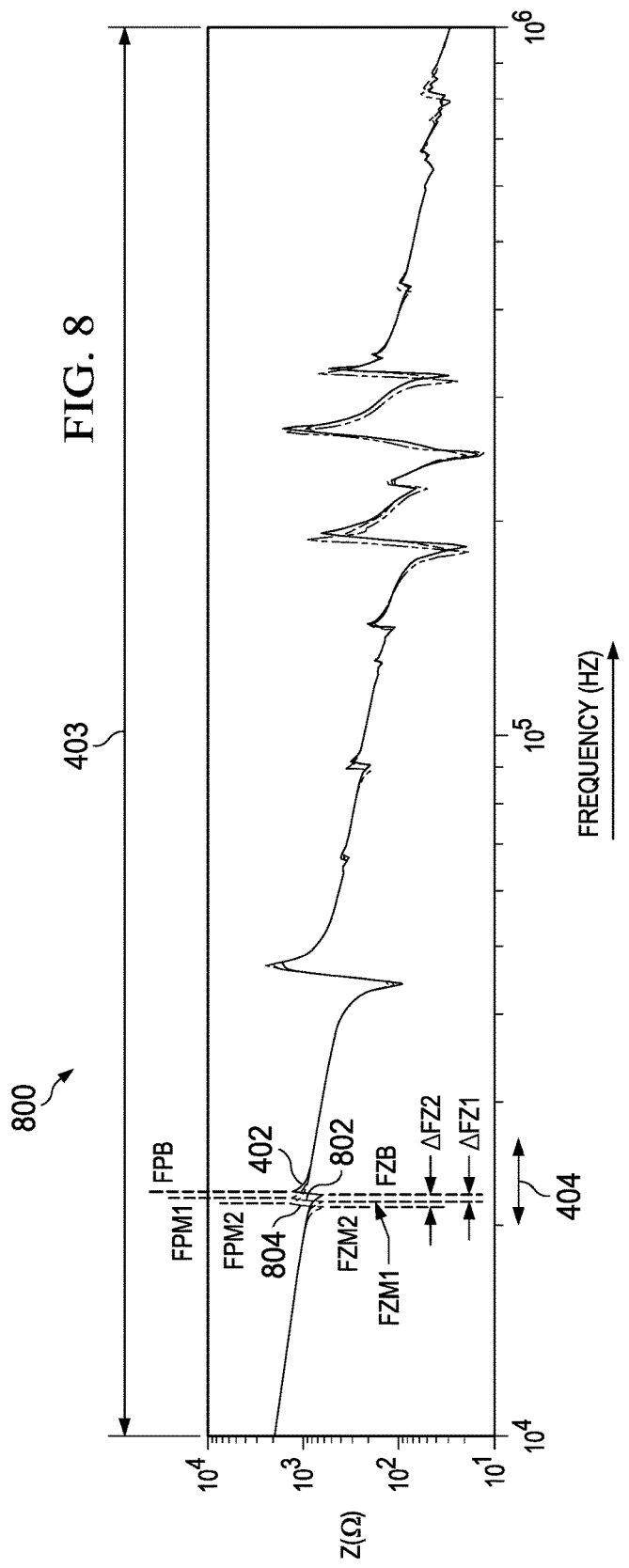
FIG. 8 is a graph of example impedance magnitude response curves as a function of excitation frequency for a lens cleaning system with a clean lens, and with lenses having water and mud contaminants.

Referring also to FIGS. 7 and 8, the controller 130 begins a new cleaning cycle at 302 in FIG. 3. In one possible implementation, the controller 130 periodically initiates a new cleaning cycle during operation of the host system 148. For example, the lens cleaning system may be installed in a vehicle-based camera system used to provide information to a control system of the host vehicle for use in one or more vehicle control functions, user interface functions, or other functions, and the controller 130 may periodically implement a new control cycle according to a predetermined or configurable time interval and/or upon request from the host system 148.

At 304 in FIG. 3, the controller 130 controls the frequency Ft of the drive signal VDRV to vibrate the lens 202 at a plurality of frequencies in a frequency range of interest 404. In one example, the controller 130 sweeps the range of interest 404 as a continuous sweep and obtains samples of the feedback signals VFB and IFB for conversion by the A/D converters 134 and 135. In other examples, the controller 130 sets the frequency Ft at a plurality of specific frequencies in the frequency range of interest 404 at 302, and obtains corresponding digital values corresponding to the converted feedback signals. The controller 130 computes sweep frequency response values 142 as the ratio of the voltage phasor value 138 to the current phasor value 139 for a given sample as described above in order to determine corresponding measured frequency response values corresponding to a plurality of frequencies in the range of interest 404.

At 306, the controller 130 determines a measured resonant frequency of the system according to the feedback signal or signals IFB, VFB. In the illustrated implementation, the controller 130 uses the feedback signals to derive the measured frequency response values 142 from the sweep. In one example, the controller 130 identifies a local maxima or a local minima in the measured frequency response values 142 for the corresponding frequency range of interest 404. In the following discussion, the controller 130 uses the zero locations to detect significant resonant frequency changes. The pole locations can alternatively be used in other implementations.

At 308 and 310, the controller 130 compares the baseline resonant frequency value (e.g., FZB) with a measured resonant frequency value (e.g., FZM) and selectively determines the existence or absence of a threshold amount of contaminants on the lens 202 according to the difference. At 308 in FIG. 3, the controller 130 computes a resonant frequency difference value as the absolute value of the difference between the measured and baseline resonant frequency values (e.g., |ΔFZ|=|FZB−FZM|) for the evaluated frequency range of interest 404. At 310, the controller 130 compares the resonant frequency difference value |ΔFZ| with a first threshold non-zero FTH1 to make an initial determination of whether or not the lens has sufficient amount of contaminants to require cleaning. In particular, the controller 130 determines that a threshold amount of contaminants are on the lens 202 if the resonant frequency difference value |ΔFZ| is greater than FTH1. If the resonant frequency difference value does not exceed the threshold (NO at 310), the controller 130 determines at 312 that no cleaning is required for this cleaning cycle, and the process 300 returns to begin the next cleaning cycle at 302 as previously described.

At 314 in FIG. 3, if a threshold amount of frequency change has occurred (YES at 310), the controller 130 determines that a threshold amount of contaminants are on the lens 202. In one example, the controller 130 includes an output 146 (FIG. 1) that selectively provides a signal CONTAMINANT to a host system 148 in response to determination of the existence of the threshold amount of contaminants on the lens 202 at 314 in FIG. 3.

The controller 130 in certain examples uses the amplitude of the difference value |ΔFZ| to distinguish between different amounts of contaminants on the lens 202, for example, using a second threshold comparison. This architecture facilitates appropriate remedial action by the host system. At 316, the controller 130 determines one or more cleaning parameters according to the amplitude of |ΔFZ|. In one example, the controller 130 compares the amplitude of the difference value |ΔFZ| with a second threshold FTH2, where FTH2>FTH1. In addition, the controller 130 in certain implementations compares the amplitude of the difference value |ΔFZ| to selectively set one or more cleaning parameters for any implemented cleaning process at 318, such as the number of cleaning phases, the cleaning duration of each phase, the cleaning power of each phase, the cleaning voltage of each phase, the cleaning frequency range of each phase, the cleaning frequency ramp rate of each phase, etc.

Figure 9:
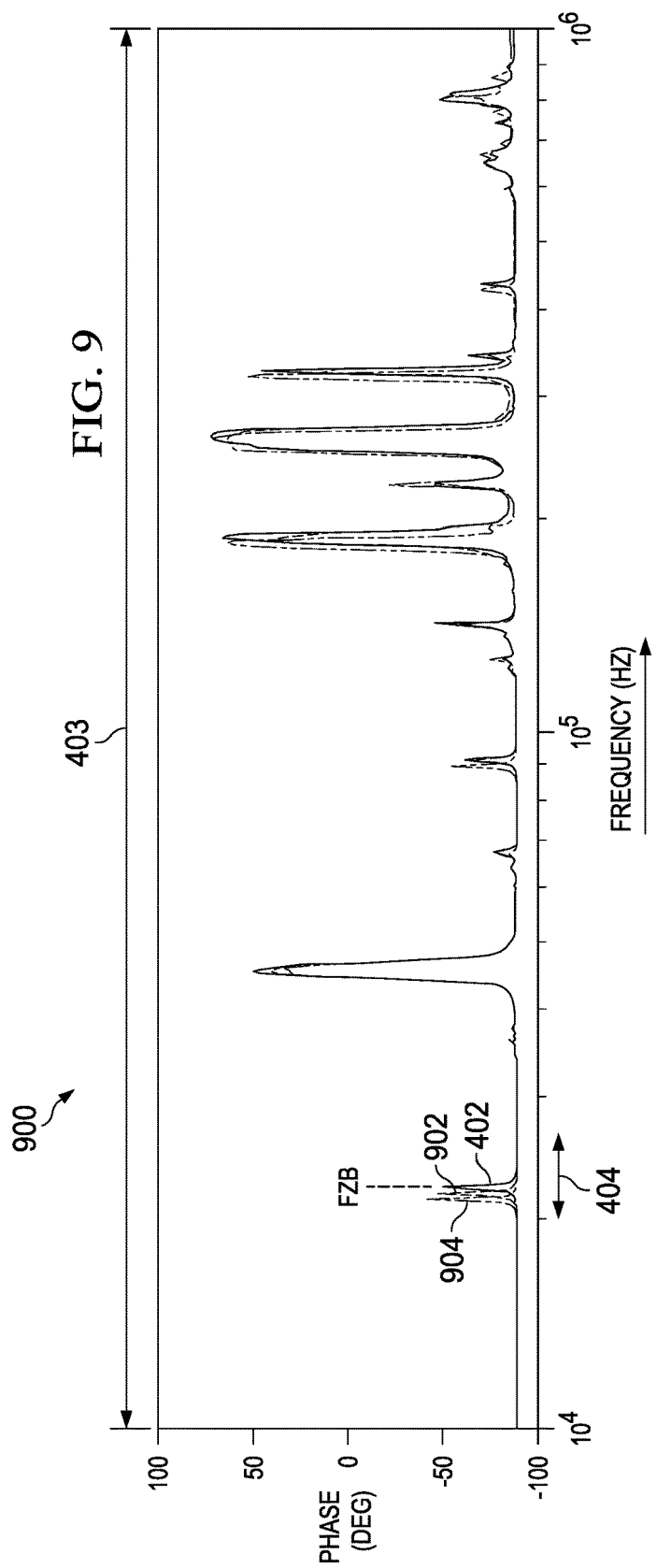
FIG. 9 is a graph of example impedance phase angle response curves as a function of excitation frequency for a lens cleaning system with a clean lens, and with lenses having water and mud contaminants.

FIGS. 8 and 9 provide impedance magnitude and phase angle response curves as a function of transducer excitation frequency, illustrating example curves for systems having a clean lens, a lens with water contaminants, and a lens with mud contaminants. The examples of FIGS. 8 and 9 correspond to the lens cleaning system response throughout the wide frequency range 403 illustrated in FIGS. 4 and 5 above for a flat lens 202. A graph 800 in FIG. 8 includes a curve 402 corresponding to a clean lens 202 in the system (e.g., as also shown in FIG. 4 above). The graph 800 further includes a curve 802 representing the impedance magnitude response of the system with water contaminants on the lens 202, as well as a curve 804 showing the impedance magnitude response of the system with mud contaminants on the lens 202. A graph 900 in FIG. 9 shows corresponding impedance phase response curve 402 corresponding to the clean lens 202, as well as curves 902 and 904 respectively showing impedance phase response for a lens 202 with water contaminants and mud contaminants. As discussed above in connection with FIG. 4, the graph 800 in FIG. 8 indicates the baseline pole frequency FPB, and the baseline zero frequency FZB within the frequency range of interest 404. The curve 402 in FIG. 9 includes a local maxima at the frequency FZB corresponding to the local minima (zero) in the curve 402 of FIG. 8. FIGS. 8 and 9 illustrate an example impedance magnitude and phase response change for water and mud relative to a clean lens 202. Moreover, these graphs 800 and 900 demonstrate that the identified frequency range of interest 404 is suitable for detecting the presence or absence of contaminants on the lens 202, and that the system is capable of detecting the presence of multiple types of contaminants on the lens 202.

As further shown in FIG. 8, the controller 130 is capable of determining measured frequency response curves 802 and 804 representing the frequency response of the lens cleaning system. The water contaminant curve 802 in this example has a local maxima in the frequency range of interest 404 designated as FPM1, and a local minima (zero) designated as FZM1. The controller 130 in one example determines the measured resonant frequency FZM1 (306 in FIG. 3 above) based on measured frequency response values 142 and the corresponding feedback signals IFB and/or VFB, and computes the corresponding resonant frequency difference value |ΔFZ1| for the water contaminant example indicated in FIG. 8. Similarly for mud contaminants on the lens 202, the controller 130 determines the measured resonant frequency value FZM2 and computes the corresponding resonant frequency difference value |ΔFZ2| shown in FIG. 8.

Figure 10:
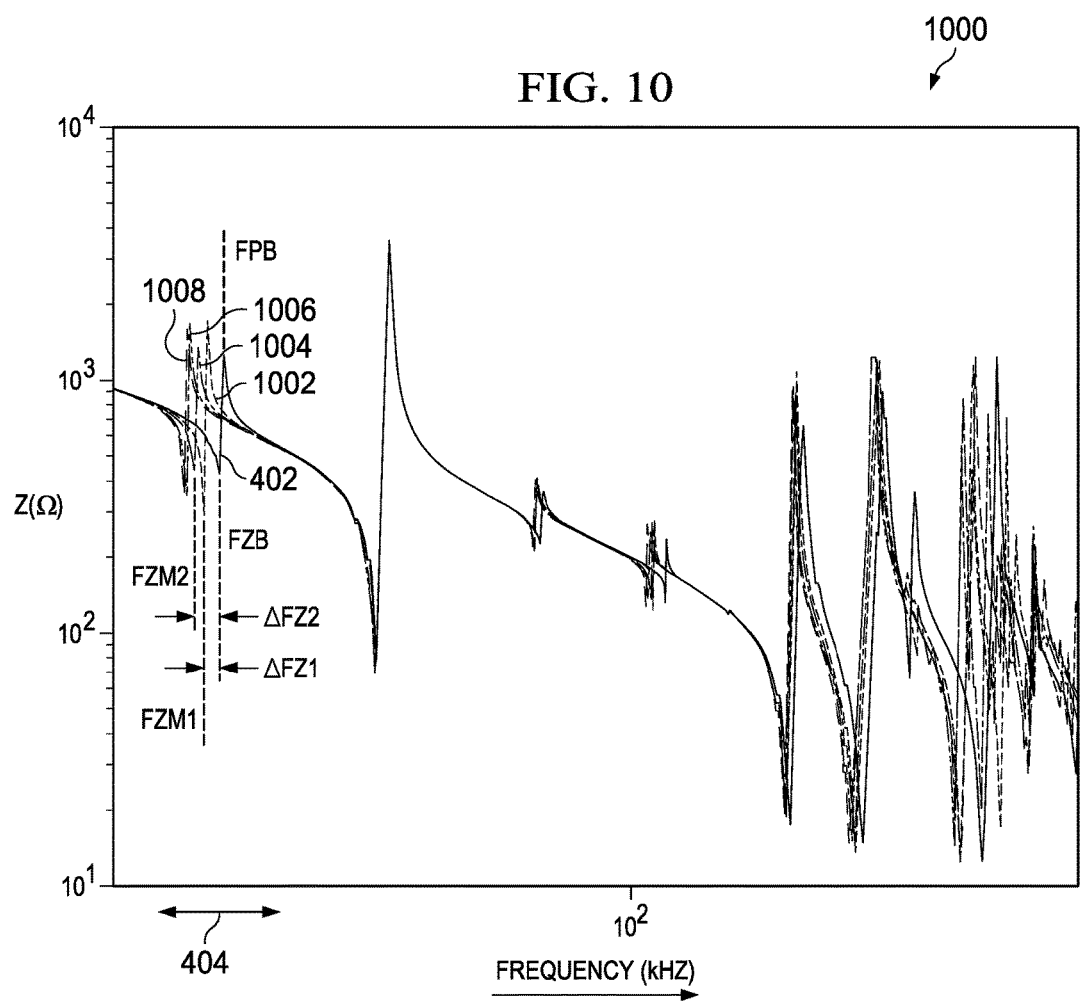
FIG. 10 is a graph of an example impedance magnitude response curves as a function of excitation frequency in a frequency range of interest for a lens cleaning system with a clean lens, and with lenses having different amounts of water contaminants in a first range.
Figure 11:
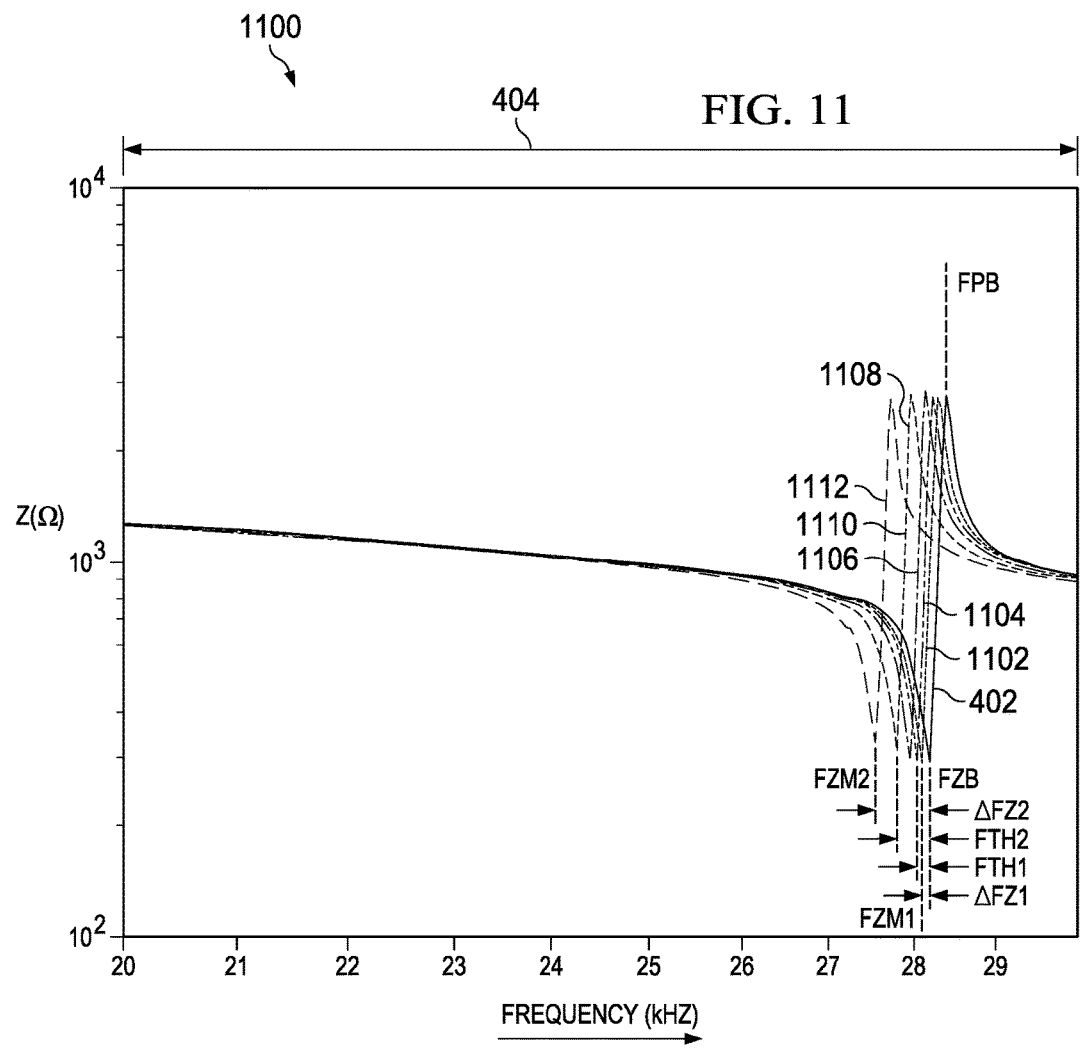
FIG. 11 is a graph of an example impedance magnitude response curves as a function of excitation frequency in the frequency range of interest for a lens cleaning system with a clean lens, and with lenses having different amounts of water contaminants in a second range.

FIGS. 10 and 11 further illustrate the capabilities of the driver 100 for lens cleanliness detection in the example frequency range of interest 404 with respect to water contaminants of different amounts on the lens 202. FIG. 10 provides a graph 1000 showing impedance magnitude response curves as a function of transducer excitation frequency in the range of interest 404 for a lens cleaning system with a clean lens 202, and with lenses 202 having different amounts of water contaminants in a first range. In particular, curve 402 shows the impedance magnitude response for a clean lens 202, curve 1002 shows the impedance magnitude response for 50 μL of water, curve 1004 shows a impedance magnitude response for 100 μL of water, curve 1006 shows the impedance magnitude response for 150 μL of water, and curve 1008 shows the impedance magnitude response for 200 μL of water on the lens 202. The graph 1000 also illustrates an example measured resonant frequency FZ1 determined by the controller 130 with respect to the curve 1002, as well as a computed resonant frequency difference value |ΔFZ1| computed by the controller 130 showing the frequency response difference due to the presence of 50 μL of water on the lens 202. Another example measured resonant frequency FZ2 is shown in FIG. 10, along with a corresponding resonant frequency difference value |ΔFZ2| corresponding to the curve 1004 illustrating the change due to the presence of 100 μL of water.

FIG. 11 provides a graph 1100 throughout the frequency range of interest 404, including a curve 402 as discussed above for a clean lens 202. In addition, the graph 1100 includes further curves 1102, 1104, 1106, 1108, 1110 and 1112 respectively corresponding to the impedance magnitude response due to the presence of 2 μL, 5 μL, 10 μL, 15 μL, 20 μL and 25 μL of water on the lens 202. FIG. 11 further indicates the above described baseline pole and zero frequencies FPB and FZB for the case of a clean lens 202. In addition, FIG. 11 shows the baseline pole frequency FPB, the baseline zero frequency FZB, and two example measured resonant frequencies FZM1 and FZM2 respectively corresponding to the measured resonant frequencies for the presence of 2 μL of water and 25 μL of water. In addition, the graph 1100 shows the corresponding first and second resonant frequency difference values |ΔFZ1| and |ΔFZ2| for the 2 and 25 μL water contaminant cases. As previously discussed, the controller 130 in certain examples compares the computed resonant frequency difference value |ΔFZ| to a first threshold FTH1. FIG. 11 shows an example of one possible first threshold value FTH1 that can be used by the controller 130. In this case, for a contaminant amount of 2 μL, the controller 130 compares the corresponding first resonant frequency difference value |ΔFZ1| with the first threshold value FTH1, and determines (310 in FIG. 3) that no cleaning is required since the |ΔFZ1|<FTH1. In the illustrated example, therefore, the controller 130 advantageously conserves energy by refraining from performing a lens cleaning operation for the current cleaning cycle (e.g., 312 in FIG. 3).

Continuing with this example, if the amount of contaminants on the lens 202 is instead 25 μL of water (curve 1112 in FIG. 11), the controller 130 compares the corresponding resonant frequency difference value |ΔFZ2| with the first threshold value FTH1, and determines (310 in FIG. 3) that cleaning is appropriate since the |ΔFZ2|>FTH1. In this case, moreover, the controller 130 then compares the resonant frequency difference value |ΔFZ2| to the second threshold value FTH2. Since |ΔFZ2|>FTH2, The controller 130 determines the cleaning power level and/or cleaning duration at 316 in FIG. 3 in order to provide a high level of cleaning in order to remove the significantly higher 25 μL amount of water contaminants on the lens 202. Multiple additional threshold determinations can be implemented in order to provide multiple levels of configurable cleaning through adjustment of one or more cleaning parameters, including without limitation cleaning duration, cleaning power level, etc. It is noted in these examples using water contaminants that the change in frequency for a corresponding change in mass on the lens 202 is detectable.

Figure 12:
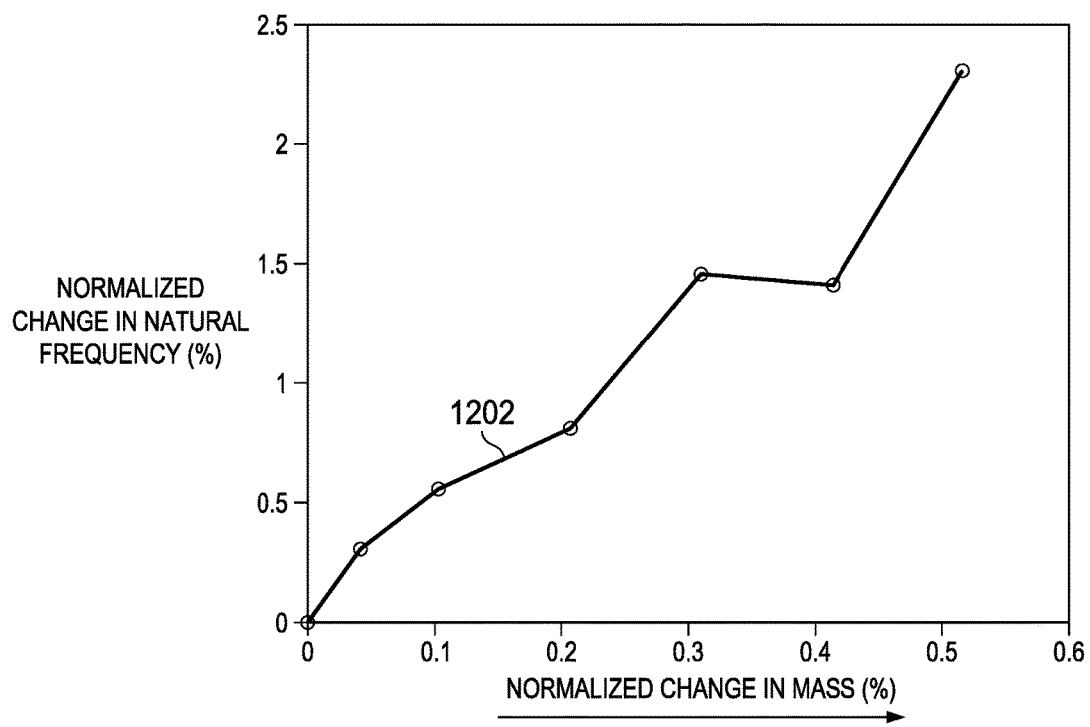
FIG. 12 is a graph of normalized natural frequency change as a function of change in mass for a lens cleaning system.

FIG. 12 provides a graph 1200 including a curve 1202 illustrating normalized natural frequency change as a function of change in mass for the example lens cleaning system. This example curve 1202 corresponds with the theoretical modeling shown in FIGS. 6 and 7 above, and verifies the capability of the controller 130 to use resonant frequency changes to successfully detect even small mass changes in the lens cleaning system to determine the relative cleanliness of the lens 202. For example, the described system results in a curve 1202 with a slope around 5, which indicates that a 0.1% mass change produces a 0.5% frequency change. In the case of 2 mL of water contaminants on the lens 202, only a 2 mg mass change is affected, which produces a detectable change of 85 Hz.

Disclosed examples advantageously facilitate identification of the presence or absence of contaminants on the lens 202, and provide various benefits in operation of the lens cleaning system based on the cleanliness detection capabilities. For example, the controller 130 can selectively determine when cleaning cycles can be skipped in a periodic cleaning operating configuration, and the controller 130 can also advantageously tailor the cleaning (when needed) to the amount of contaminants present on the lens 202. This objective can be accomplished, for instance, by changing start and stop times (e.g., cleaning duration) for periodic cleaning operations, thereby reducing energy consumption. In this regard, the frequency response analysis (e.g., 304-312 in FIG. 3) consumes less power than does a cleaning operation (318), and each time the controller 130 selectively determines that no cleaning is required (312), energy is saved by the overall lens cleaning system. Moreover, the system can intelligently employ higher power clean only when needed. As previously discussed, moreover, the initial analysis and determination of the measured resonant frequency can provide control information for actual cleaning operation. In particular, the controller 130 can intelligently clean at the measured resonant frequency and/or begin cleaning at the measured frequency and transition the cleaning frequency Ft toward the baseline frequency on the assumption that additional cleaning moves the system resonance point toward the baseline value. In this manner, the identification of the appropriate starting frequency for the cleaning operation at 318 allows the system to more fully take advantage of the true natural frequency of the system that includes the detected contaminants, thereby improving the cleaning efficiency by energizing the transducer 102 at a resonant frequency of the overall system.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

The following is claimed:

1. Apparatus comprising:
a driver having a driver output adapted to be coupled through a transducer to a lens, the driver including:
a feedback circuit having a feedback input and a feedback output, the feedback input coupled to the driver output, and the feedback circuit configured to provide a feedback signal at the feedback output responsive to the feedback input, the feedback signal representing an electrical property of the transducer; and
a controller coupled between the feedback output and the driver output, the controller configured to:
provide an oscillating drive signal at the driver output for causing the transducer to vibrate the lens at frequencies within a frequency range;
responsive to the feedback signal, determine a resonant frequency of the lens within the frequency range; and
responsive to a difference between the determined resonant frequency and a baseline resonant frequency of the lens, selectively provide the drive signal at the driver output for causing the transducer to vibrate the lens in a lens cleaning operation.

2. The apparatus of claim 1, wherein:
the feedback signal includes: a current feedback signal representing a current flowing in the transducer; and a voltage feedback signal representing a voltage of the transducer; and
the controller is configured to:
while causing the transducer to vibrate the lens at the frequencies within the frequency range, determine frequency response values responsive to the current feedback signal and the voltage feedback signal;
responsive to the frequency response values, determine the resonant frequency of the lens within the frequency range;
compute an absolute value of the difference between the determined resonant frequency and the baseline resonant frequency; and
determine whether the lens has a threshold amount of contaminants responsive to whether the absolute value of the difference is greater than a non-zero frequency threshold value.

3. The apparatus of claim 2, wherein the controller is configured to:
determine a frequency response profile of the lens responsive to the frequency response values; and
determine the resonant frequency as a local minima or a local maxima of the frequency response profile.

4. The apparatus of claim 2, wherein the frequency threshold value is a first frequency threshold value, and the controller is configured to determine a cleaning phase, a voltage level of the cleaning phase, a frequency sweep range of the cleaning phase, and a frequency sweep rate of the cleaning phase, responsive to the absolute value of the difference and to a second frequency threshold value, the second frequency threshold value being greater than the first frequency threshold value.

5. The apparatus of claim 1, wherein the controller is configured to selectively provide the drive signal at the driver output for causing the transducer to vibrate the lens in the lens cleaning operation using a cleaning power level or a cleaning duration, responsive to the determined resonant frequency.

6. The apparatus of claim 5, wherein the controller is configured to:
while causing the transducer to vibrate the lens at the frequencies within the frequency range, determine frequency response values responsive to the feedback signal;
determine a frequency response profile of the lens responsive to the frequency response values; and
determine the resonant frequency as a local minima or a local maxima of the frequency response profile.

7. The apparatus of claim 1, wherein the controller is configured to:
while causing the transducer to vibrate the lens at the frequencies within the frequency range, determine frequency response values responsive to the feedback signal;
determine a frequency response profile of the lens responsive to the frequency response values; and
determine the resonant frequency as a local minima or a local maxima of the frequency response profile.

8. The apparatus of claim 1, wherein the controller is configured to:
while causing the transducer to vibrate the lens at the frequencies within the frequency range, determine frequency response values responsive to the feedback signal for a clean lens;
determine a baseline frequency response profile of the lens responsive to the frequency response values;
store the baseline frequency response profile; and
identify the baseline resonant frequency as a local minima or a local maxima of the baseline frequency response profile.

9. The apparatus of claim 1, wherein the driver output, the feedback circuit, and the controller are part of a single integrated circuit.

10. A lens cleaning system, comprising:
a lens;
a transducer mechanically coupled to the lens;
a driver having a driver output coupled to the transducer, the driver including:
a feedback circuit having a feedback input and a feedback output, the feedback input coupled to the driver output, and the feedback circuit configured to provide a feedback signal at the feedback output responsive to the feedback input, the feedback signal representing an electrical property of the transducer; and
a controller coupled between the feedback output and the driver output, the controller configured to:
provide an oscillating drive signal at the driver output for causing the transducer to vibrate the lens at frequencies within a frequency range;
responsive to the feedback signal, determine a resonant frequency of the lens within the frequency range; and
responsive to a difference between the determined resonant frequency and a baseline resonant frequency of the lens, selectively provide the drive signal at the driver output for causing the transducer to vibrate the lens in a lens cleaning operation.

11. The lens cleaning system of claim 10, wherein:
the feedback signal includes: current feedback signal representing a current flowing in the transducer; and a voltage feedback signal representing a voltage of the transducer; and
the controller is configured to:
while causing the transducer to vibrate the lens at the frequencies within the frequency range, determine frequency response values responsive to the current feedback signal and the voltage feedback signal;
responsive to the frequency response values, determine the resonant frequency of the lens within the frequency range;
compute an absolute value of the difference between the determined resonant frequency and the baseline resonant frequency; and
determine whether the lens has a threshold amount of contaminants responsive to whether the absolute value of the difference is greater than a non-zero frequency threshold value.

12. The lens cleaning system of claim 11, wherein the controller is configured to:
determine a frequency response profile of the lens responsive to the frequency response values; and
determine the resonant frequency as a local minima or a local maxima of the frequency response profile.

13. The lens cleaning system of claim 11, wherein the frequency threshold value is a first frequency threshold value, and the controller is configured to determine a cleaning phase, a voltage level of the cleaning phase, a frequency sweep range of each cleaning phase, a frequency sweep rate of the cleaning phase, and a duration of the cleaning phase, responsive to the absolute value of the difference and to a second frequency threshold value, the second frequency threshold value being greater than the first frequency threshold value.

14. The lens cleaning system of claim 10, wherein the controller is configured to selectively provide the drive signal at the driver output for causing the transducer to vibrate the lens in the lens cleaning operation using a cleaning phase, a voltage level of the cleaning phase, a frequency sweep range of the cleaning phase, a frequency sweep rate of the cleaning phase, and a duration of the cleaning phase, responsive to the determined resonant frequency.

15. The lens cleaning system of claim 14, wherein the controller is configured to:
while causing the transducer to vibrate the lens at the frequencies within the frequency range, determine frequency response values responsive to the feedback signal;
determine a frequency response profile of the lens responsive to the frequency response values; and
determine the resonant frequency as a local minima or a local maxima of the frequency response profile.

16. The lens cleaning system of claim 10, wherein the controller is configured to:
while causing the transducer to vibrate the lens at the frequencies within the frequency range, determine frequency response values responsive to the feedback signal;
determine a frequency response profile of the lens responsive to the frequency response values; and
determine the resonant frequency as a local minima or a local maxima of the frequency response profile.

17. The lens cleaning system of claim 10, wherein the controller is configured to:
while causing the transducer to vibrate the lens at the frequencies within the frequency range, determine frequency response values responsive to the feedback signal for a clean lens;

determine a baseline frequency response profile of the lens responsive to the frequency response values;
store the baseline frequency response profile; and
identify the baseline resonant frequency as a local minima or a local maxima of the baseline frequency response profile.

\* \* \* \* \*